US006970652B2

(12) United States Patent
Zhang et al.

(10) Patent No.: US 6,970,652 B2
(45) Date of Patent: Nov. 29, 2005

(54) AUTO-SETTING AND OPTIMIZATION OF EAM WITH OPTICAL LINE SYSTEMS

(75) Inventors: Genzao Zhang, Ottawa (CA); Xiaoli Fu, Nepean (CA); Feng Shi, Kanata (CR); Tongqing Wang, Los Altos, CA (US); Jinghui Li, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 10/277,204

(22) Filed: Oct. 22, 2002

(65) Prior Publication Data

US 2004/0208514 A1 Oct. 21, 2004

Related U.S. Application Data

(60) Provisional application No. 60/336,714, filed on Dec. 7, 2001.

(51) Int. Cl.[7] .............................................. H04B 10/00
(52) U.S. Cl. ...................................... 398/162; 398/156
(58) Field of Search ............................. 359/124–140, 359/154, 159, 161, 173, 174, 179, 187, 188

(56) References Cited

U.S. PATENT DOCUMENTS

| 5,673,129 | A | | 9/1997 | Mizrahi ...................... 359/124 |
| 6,111,681 | A | * | 8/2000 | Mizrahi et al. ............. 359/187 |
| 6,134,034 | A | * | 10/2000 | Terahara .................... 359/124 |
| 6,204,945 | B1 | * | 3/2001 | Iwata et al. ................. 359/124 |
| 6,233,082 | B1 | * | 5/2001 | Johnson ...................... 359/237 |
| 6,583,910 | B1 | * | 6/2003 | Satoh ........................ 398/182 |
| 2002/0018266 | A1 | | 2/2002 | Ooi et al. ................... 359/161 |
| 2003/0058494 | A1 | | 3/2003 | Roberts et al. ............. 359/115 |

FOREIGN PATENT DOCUMENTS

| EP | 0481242 | 9/1991 | ............. G01J/9/02 |
| EP | 0644633 | 8/1994 | ............. H01S/3/06 |
| EP | 0878882 | 5/1998 | ......... H01S/5/0683 |

OTHER PUBLICATIONS

"Advanced Network Management"; Paul N. Jean and Barry W. Kort; pp. 1–10.

"Modeling of Nolm Demultiplexers Employing Optical Soliton Control Pulse"; Z. Ghassemlooy, C.Y. Cheung, and A.K. Ray; Microwave and Optical Technology Letters; vol. 21; No. 3; May 5, 1999; pp. 205–208.

"Neural Network Diagnostic Algorithm and Smart Sensor"; Michele R. Banish, Roland Anderson, Heggere Ranganath, Brian Jones and Jim Kirsch; Biomedical Diagnostic, Guidance, and Surgical–Assist Systems II; Proceedings of SPIE vol. 3911; 2000; pp. 58–68.

"Operation of Integrated InGaAsP–InP Optical Amplifier–Monitoring Detector with Feedback Control Circuit"; K.–Y. Liou, U. Koren, E.C. Burrows, M. Oron, B.I. Miller, M. Young, G. Raybon and C.A. Burrus; IEEE; 1990; pp. 878–880.

* cited by examiner

Primary Examiner—M. R. Sedighian
Assistant Examiner—Agustin Bello
(74) Attorney, Agent, or Firm—Fish & Richardson P.C.

(57) ABSTRACT

According to the invention there is provided a method of controlling an optical communication system comprising an optical transmitter, an optical receiver and an optical fiber interconnecting the optical transmitter and the optical receiver, the method comprising determining the performance of the optical communication system and controlling at least one setting parameter of the optical transmitter according to the measured performance.

8 Claims, 7 Drawing Sheets

AUTO-SETTING AND OPTIMIZATION OF EAM WITH OPTICAL LINE SYSTEMS

This application claims the benefit of U.S. Provisional Application No. 60/336,714, filed Dec. 7, 2001.

FIELD OF THE INVENTION

This invention relates to the end-to-end performance optimization of an optical communication system.

BACKGROUND OF THE INVENTION

Optical communication systems are at the core of modern telecommunications. They provide performance in terms of speed, capacity and reliability that make them an indispensable technology within the global communications infrastructure. To that end countless optical/electrical (optoelectronic) technologies have been developed to support the transmission and reception of optical signals through optical fiber channels. However, there has been, to this point, very little done in the field to investigate the effective deployment and configuration, of these new technologies, that would allow for the optimization of the end-to-end system performance in a closed loop configuration.

In conventional transmitter and receiver design great attention is paid to the configuration, setting, and control of optical and electronic components themselves. That is to say that the transmitter design is optimised with respect to its components and independently of the receiver and the effect of the fibre. Likewise the receiver is optimised with respect to its components independently of the transmitter and effect of the fibre. Thus no effort is made to optimise the end-to-end system performance by making setting/control choices taking the transmitter, receiver and fibre performances into consideration.

For example, in order to control the laser diode (LD) within the transmitter so that it has a stable optical output power while remaining accurately tunable in the spectrum of interest, an electronic closed-loop control mechanism is designed to control the temperature and bias (pump) current of the LD. However, that loop is a local loop within the transmitter, not a system loop. Thus, performance information from elsewhere in the optical communications system is not considered in the adjustment of the LD. Similar localized control loops exist all over the optical communication system.

However, as the art progresses and increased data-rates are demanded these localized control loops will not be able to provide a cost effective or efficient means for designing reliable high-speed optical communication links, and does not provide a means for tuning of the whole system to an optimal operating condition.

The above-discussed problems exist in both single-span and multiple span optical links. A single-span optical communication link can typically extend over distances of hundreds of meters up to about 80 km without the use of repeaters or amplifiers. Thus the transmitter is connected directly to the receiver by a fibre optic cable. Multiple transmissions may be combined through a multiplexer and the combined signal is transmitted to a receiving demultiplexer via a single fibre optic cable, without repeaters or amplifiers. Upon reception the combined signal is demultiplexed and routed to respective receivers. Multiple-span links then do include repeaters and/or amplifiers to boost the signal as it travels between its source and destination, whether the source provides a single channel or a combined signal formed by multiplexing multiple channels.

SUMMARY OF THE INVENTION

According to the invention there is provided a method of controlling an optical communication system comprising an optical transmitter, an optical receiver and an optical fiber interconnecting the optical transmitter and the optical receiver, the method comprising determining the performance of the optical communication system and controlling at least one setting parameter of the optical transmitter according to the measured performance.

Typically the optical transmitter includes an EAM (electronic absorption modulator) fed by a DA (driver amplifier) and an LD (laser diode) and in this case the setting parameter which is controlled may be one or more of the RF signal input cross point, swing range and bias voltage of the DA and the temperature (TEC) of the EAM.

The invention uses a controller connected in a closed feedback loop between the receiver and the transmitter. This closed loop may be any type of state of the art communications medium such as the existing OSC (optical signal channel), OAM (operation and maintenance) system or sub-network of the optical communication network or a LAN or WAN data network. It is noted that high speed for the feedback control loop is not necessary.

According to the invention optimization of the end-to-end system performance is achieved by collecting raw system performance information (RSPI) from which at least one performance indication parameter (PIP) is derived and this is used to adjust the behavioral characteristics of a modulated optical output from the optical transmitter. The adjustments are made so that the modulated optical output matches the best possible transmission characteristics of the fiber link that connects the optical transmitter to the optical receiver and the acceptance characteristics of the optical receiver.

The controller preferably has three modes of operation; those modes being: An idle mode; an auto-setting mode; and a dynamic control mode.

During the idle mode the controller does nothing except poll incoming signals, or wait for an interrupt command, that would indicate that it should change its mode of operation.

The auto-setting mode is comprised of: a speed search stage; a fine tune stage; and a setting decision stage.

The method of the speed search stage is comprised of a number of steps. The first step is to pre-attenuate a linear amplifier integrated with automatic gain control that is located within the receiver. The second step would be to decide upon a search range of all of the setting parameters. A third step in which a number of search points is calculated, from which the fourth step is to set the setting parameters, measure the RSPI and process/record the system PIP's. After the fourth step the fine tune range(s) are calculated and stored in memory for the next stage.

The fine tune stage is also comprised of a number of steps. The first step is to increase the search resolution based on the fine tune range(s) calculated in the previous step. The second step is the setting of the setting parameters, measuring the RSPI and processing/recording of the associated PIP's, from which in the third step new decision range(s) are calculated. At the fourth step a final decision range is calculated or the process begins again, from the first step of the Fine Tune Stage, if the optimal operating point has not been located.

The setting decision stage is where a decision is made on an optimal set of setting parameters. The decision is based on the information produced in the Fine Tune Stage; and this stage simply serves to ensure that the transmitter receives the new set of setting parameters that will provide the optimal point of operation for the entire system.

The dynamic control mode is comprised of a number of steps. The first step being an incremental change in one or more of the four setting parameters and a measurement of a number of PIP's. The second step is to collect a sufficient number of PIP measurements. The third step is to process a matrix associated with each of the PIP's. Upon processing of the PIP's a decision made on whether or not to adjust the four setting parameters if the incremental change improved the performance of the optical link between the transmitter and receiver or to select a new incremental change if the change did not improve the system performance. Given that the change made did improve the performance of the optical link, the fourth step of this process is to set the newly calculated setting parameters within the system to improve performance. The dynamic control mode process's continue indefinitely until the controller is requested to stop or enter another mode of operation.

DESCRIPTION OF THE PREFERRED EMBODIMENTS

Figure 1:
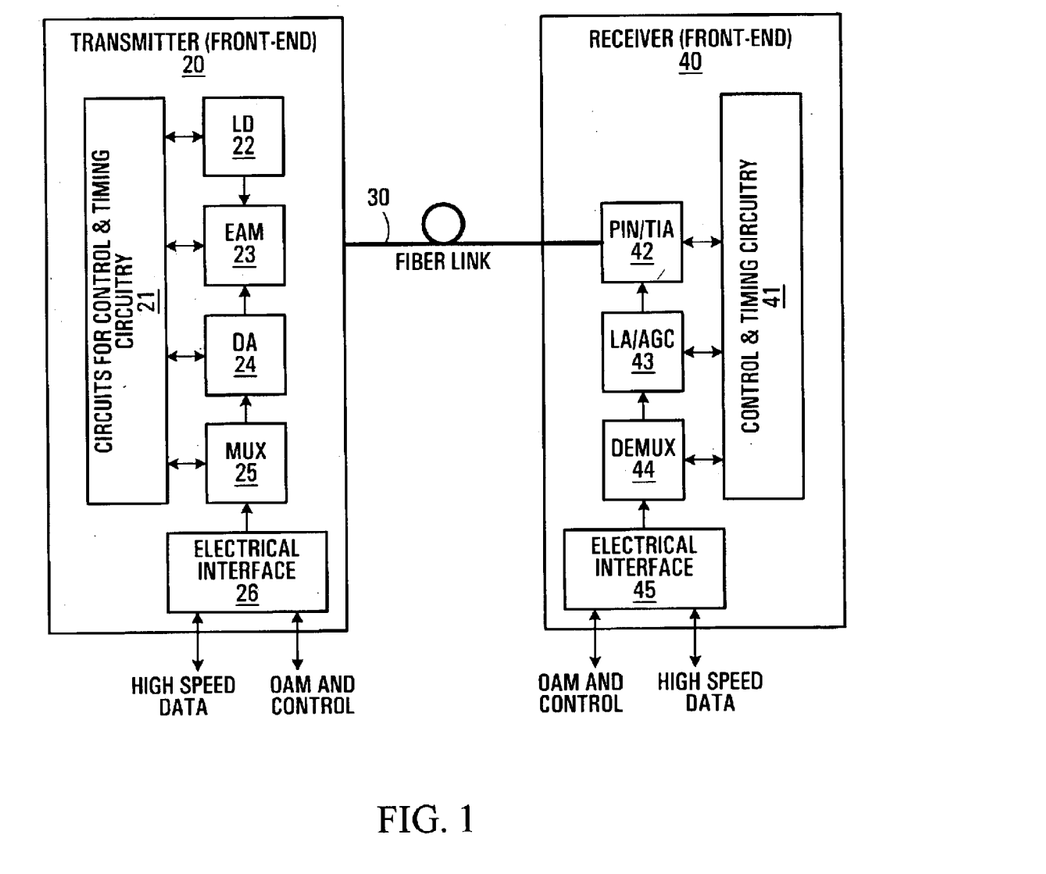
FIG. 1 is a schematic view of a typical optical transmission system.

Referring to FIG. 1, a typical single transmitter and receiver optical transmission system consists of a transmitter front-end module 20 which is connected via an optical fiber link 30 to a receiver front-end module 40.

More particularly, the transmitter front-end module 20 is a collection of a number of functional blocks and in this description only the blocks most relevant to the invention are discussed. The functional blocks important to the invention are: an N×1 multiplexer (MUX) 25 used to combine a number N parallel electrical low bit rate signals each representing a bit stream, for example with a bit rate of 2.5 Gbps each, into one serial electrical high bit rate signal also being a bit stream, for example with a 40 Gbps bit rate; a laser diode (LD) 22; a driver amplifier (DA) 24; an electronic absorption modulator (EAM) 23; a logic-gate array 21 used to implement the control and timing circuitry for the transmitter front-end module; and finally, an electrical interface 26 that allows the transmitter front-end to interact with other parts of the transmitter (not shown).

The receiver front-end module 40 is also a collection of a number of functional blocks, and, again, in this description only the blocks most relevant to the invention are discussed. The functional blocks important to this invention are: a PIN photo diode and Transimpedance amplifier (PIN/TIA) 42; a linear amplifier integrated with an automatic gain control (LA/AGC) circuit 43; a 1×N demultiplexer (DEMUX) 44, used to separate a single serial electronic signal into N parallel electronic signals; a logic-gate array 41, used to implement the control and timing circuitry; and finally, an electrical interface 45 that allows the receiver front-end to interact with other parts of the receiver (not shown).

Figure 2:
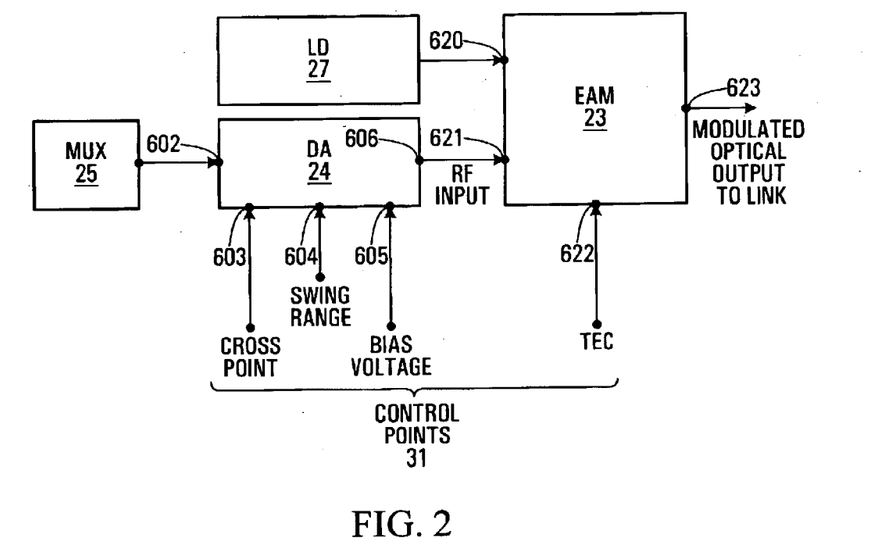
FIG. 2 is a schematic view showing portions of the transmission system of FIG. 1 in greater detail.

Referring now to FIG. 2, this shows the EAM 23 and the DA 24 of FIG. 1 in greater detail. The EAM 23 delivers a modulated optical output from a terminal 623 of the EAM 23 by combining the optical output of the LD 22 and RF output of the DA 24, each entering one of two terminals 620 and 621 of the EAM 23, respectively. The modulated optical output will be transmitted over the fiber link 30 and received by the front-end receiver module 40 as shown in FIG. 1.

Additionally, referring to FIG. 2, the performance of the EAM 23 is temperature dependent; thus, a control point for the EAM 23 is its temperature (TEC). The DA 24 used to produce the RF input for the EAM 23 amplifies an electrical signal, representing a bit-stream from the MUX 25. The pre-amplified bit stream enters an input terminal 602 of the DA 24 and the amplified electrical signal, being the RF input for the EAM 23, leaves an output terminal 606, of a DA 24. Furthermore, the cross-point (CP), the allowable signal swing range (SR) and the bias-voltage or bias-position (BP) of the output and input, respectively, have an impact on the performance of the DA 24, which in turn effects the overall performance of the transmitter and optical link. The aforementioned parameters, called EAM setting/controlling parameters, are the control points for the DA 24, relevant to the invention. It would be obvious to one skilled in the art that the DA 24 and the EAM 23 could be integrated together to form a single sub-module of a front-end transmitter 20. The functional blocks described herein are meant to describe the required functions within a transmitter and not necessarily specify the complete transmitter.

The aforementioned key setting parameters can be used to change the EAM characteristic behaviors and transmitter performance. The EAM, and more generally the transmitter, can be characterized by a number of behavioral parameters that describe the modulated optical output of the transmitter. These parameters are the Chirp-factor (CF); insertion-loss (IL); extinction-ratio (ER), and output cross-point position (CP). As well, it is known to those skilled in the art that these parameters are intimately related and more importantly they have a significant impact on the end-to-end system performance. Also, since the whole system and the optical signal characteristics are dependent on environmental conditions (e.g. temperature), the end-to-end system performance will be continuously, and without compensation, degraded. As will be described below the present invention provides a means for compensating for such environmental factors by altering the modulated optical signal characteristics (i.e. CF, IL, ER, and CP) before transmission through the fiber link, by controlling the EAM setting parameters.

As shown in FIG. 2 there are four setting parameters that may be used to change the behavioral parameters of the EAM 23. In the future, a polarization mode, such as a transverse electric (TE) or transverse magnetic (TM), of the optical input to the EAM 23 could be used as another setting parameter.

An example of the aforementioned relationships can be seen in the following scenario: A wide RF swing range would result in a higher ER, which is good for system performance; however, a larger swing range also leads to a higher IL, which degrades system performance. Simultaneously, by manipulating the RF signal crossingpoint for the same EAM, with given ER and IL, a better optical pulse shape could be created to compensate for the ER and IL, as well as to compensate for signal degradation from the fiber and mismatch loss at the receiver. This would then lead to an increase in performance. However, the parameters are nonlinearly related to one another as well as to other environmental factors; thus, locating the optimal operating points can not be done without matching the transmitter behavior to the fiber-link and receiver.

Figure 3:
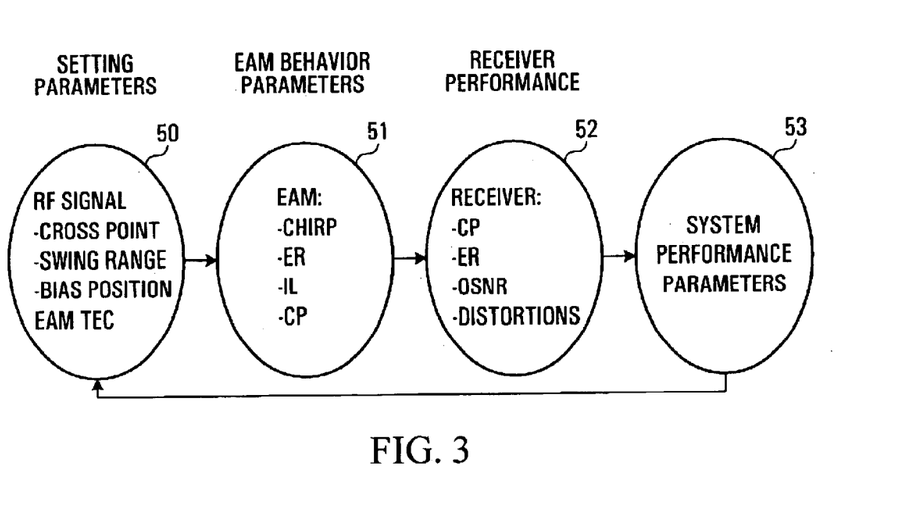
FIG. 3 is a diagram illustrating the logic relations among various parameters, relating to the transmission system of FIG. 1.

FIG. 3 illustrates the relationship among the setting parameters, EAM behavior parameters, receiver performance parameters and end-to-end system performance parameters. Changing one or any combination of the RF signal cross point, swing range and bias position, at the DA 24, and the temperature of the EAM 23 will change the EAM's chirp factor (CF), extinction ratio (ER), insertion loss (IL), and modulated optical signal cross point (CP). Changes of the EAM 23 behavior parameters result in characteristic changes of the modulated optical signal delivered by the EAM 23. This is important, because a unique optimal optical signal exists such that after traversing a fiber-link 30, the received optical signal, having been degraded by the fiber, matches the receiver front-end 40 behavioral characteristics. Thus, by tuning the setting parameters 50, transmitter and receiver front-end modules 20 and 40 linked by the optical fiber 30 can achieve their best possible performance based on the realization of the optimum end-to-end system performance parameters 53.

Figure 4:
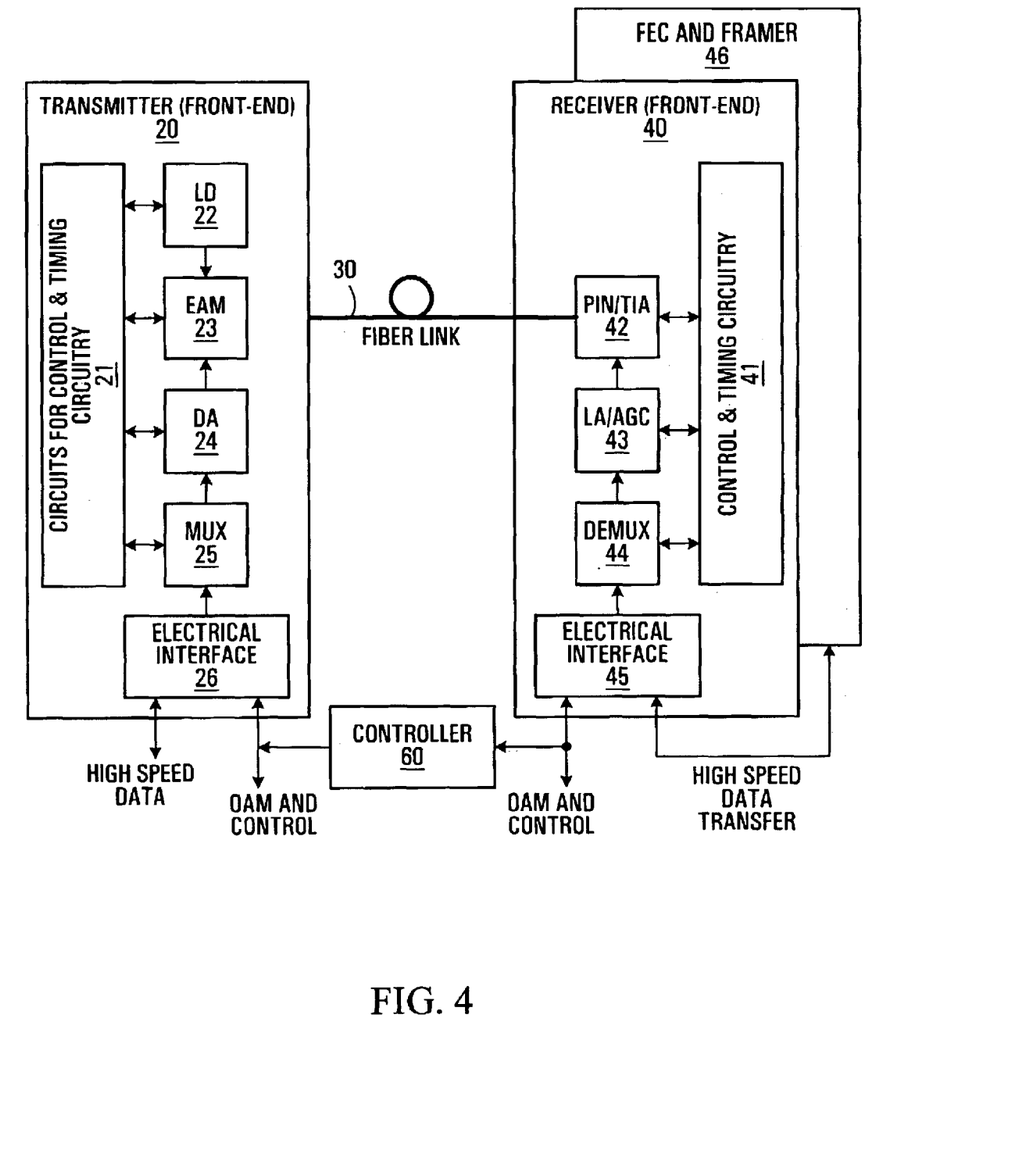
FIG. 4 is a schematic representation of the setting and control architecture of the transmission system according to the invention.

FIG. 4 is a schematic representation of the setting and control architecture for the invention. FIG. 4 is similar to FIG. 2 with the addition of a forward error-control (FEC) and framer module 46 on the receive side of the fiber link 30. The FEC and framer module 46 shares information with the receiver front-end 40 via the electrical interface 45. That interface 45 also allows the receiver-front end to pass/accept information from a controller 60 that is interconnected between interface 45 and the interface 26 of transmitter front end 20.

The controller 60 can be built into the transmitter or receiver or can be a separate component of the system altogether. Thus, the location of the controller 60 is not relevant to the invention, as its location will not effect the performance of the system or method of optimizing the system.

Figure 5:
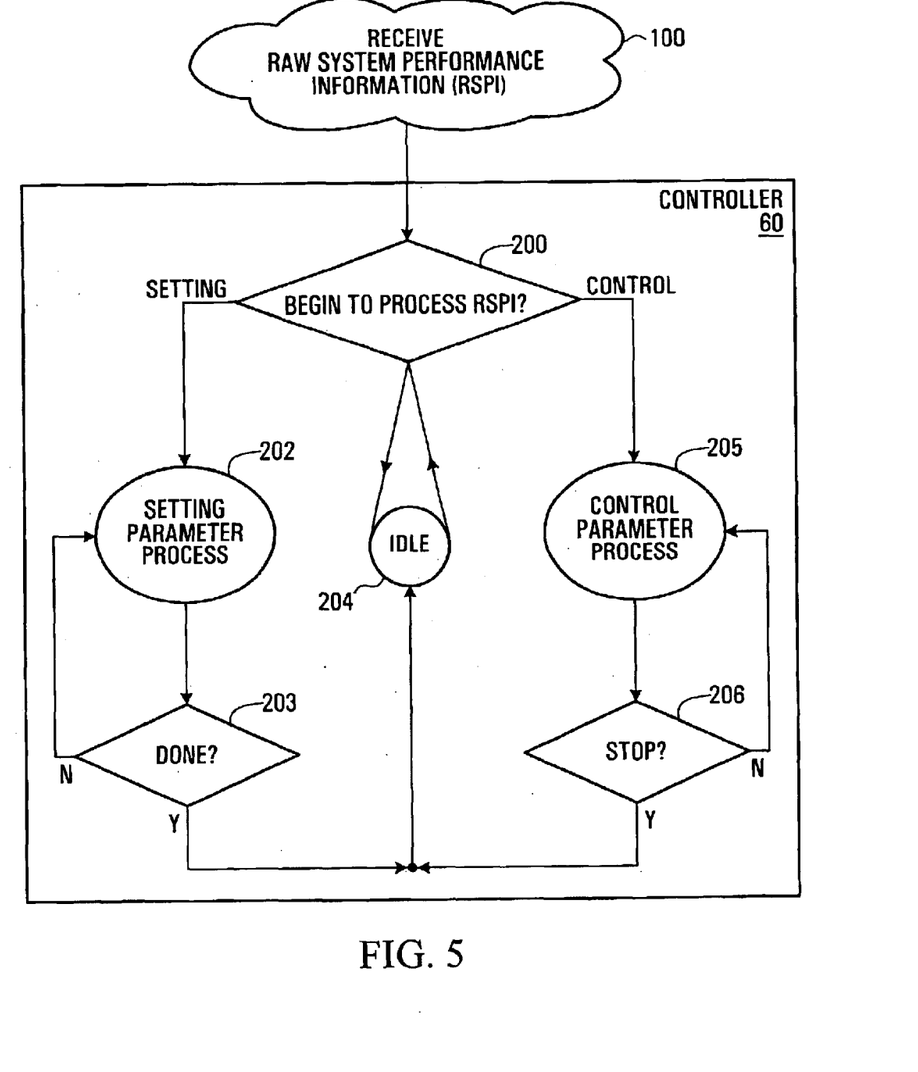
FIG. 5 is a flow chart illustrating the function of a controller forming part of the architecture of FIG. 4.

FIG. 5 is a flow chart illustrating the function and logic of the controller 60. The controller 60 carries out Raw System Performance Information (RSPI) processing, the decision on setting or control, setting or control parameter calculation outputs to adjust the control points available for change within the transmitter 20. For this purpose, the controller 60 has three states of operation: an idle mode; an auto-setting (or setting); a dynamic-control (or control) mode.

At any given instant upon receiving the RSPI 100, at step 200, the controller 60 will begin to process the RSPI 100 by entering one of its three modes of operation, as introduced above. If the system is being initialised for the first time the controller 60 will enter the setting parameter process 202 (auto-setting mode) during which time the controller 60 will monitor the performance of the system and decide at 203 to continue the setting parameter process 202 or go to the idle mode 204, based on predetermined performance goals stored in the controller's memory. If the system is already in use and the controller 60 is in idle mode the controller 60 can receive commands to enter a control parameter process 205 (dynamic control mode). The controller 60 remains in the dynamic control mode until it is given the command to stop and return to idle 204, at step 206. The three modes of operation are described in more detail below.

Both the setting and control modes 202 and 205 process the RSPI 100 to adjust the setting parameters until the system performance is optimized. Depending on the type of RSPI 100 received from the receiver, the RSPI 100 shall go through different processes that will deliver a final end-to-end system Performance Indication Parameter (PIP). For example, if the RPSI 100 is the frame FEC error-counted number, the RSPI processing will consist of: 1) Rate adaptation: as FEC is usually done at a lower rate than the transmission system rate, the error number accounted at the low rate may have to be transformed or processed to the link rate; 2) Storage of the line rate FEC error number calculated in step 1 for further application. 3) Calculation of the PIP at the line rate, with at least two calculation windows pre-decided, say Tw1 and Tw2. Tw1 is a shorter time window over which a short-term line PIP1 is calculated, while Tw2 is a longer time window over which a long-term line PIP2 is calculated.

From the example above, the PIP could be the line bit-error-rate (BER) or linear quality (Q) of the transmission line. However, those skilled in the art would be able to apply any known channel measurement/characterization parameter to the PIP. Also, Tw2 should be long enough such that an accurate PIP can be calculated during the normal operation of the optical link (i.e. at lower BERs). Conversely, Tw1 is chosen shorter than Tw2 so that poor link performance can be tracked (i.e. at high BERs). Thus, PIP1 is calculated and reported at a rate equal to or lower than Tw1, and PIP2 is calculated and reported at the same but typically at a lower rate than the rate PIP1 is calculated and reported at.

During the idle mode 204 of the controller 60, the controller 60 does nothing but poll the incoming signals, or wait for an interrupt signal, that would indicate that the controller 60 should change to either setting mode 202 or control mode 205.

During the auto-setting mode 202, the controller 60 shall proceed through an auto-setting process that is defined further along in this disclosure, until the system performance is optimized. Upon doing so, the controller 60 will change to control mode if requested to do so; otherwise, it will automatically go back to its idle mode 204. The controller 60 shall start the auto-setting mode with default setting parameter values, ranges, etc., unless it is requested to start with values that are different from the default values, so that the optimisation can be sped along with extrinsic information available to the controller. Such information could be created by the controller from previous iterations of the setting or control method.

The controller 60 may go into the auto-setting mode 202 in the following cases: 1) Power-up of the transmitter, receiver, or both; 2) After the transmitter and/or the receiver is reset; 3) At anytime the controller is requested to do so.

During the control mode 205, the controller dynamically tracks and adjusts the setting parameters to maintain optimal operation of the communication link, until it is requested to stop. Upon ceasing its operation in control mode 205 the controller 60 returns to an idle mode 204. The controller 60 starts the control mode 205 with the control initial setting parameters that are either the auto-setting process outputs, or the results from a previous dynamic control mode process.

The controller 60 may start the dynamic control process (control mode) 205 in the following cases: 1) When the auto-setting process has been completed and there has been a request to dynamically maintain the optimal channel performance; 2) During the normal operation of the transmission link; 3) At anytime the controller is request to do so.

Figure 6:
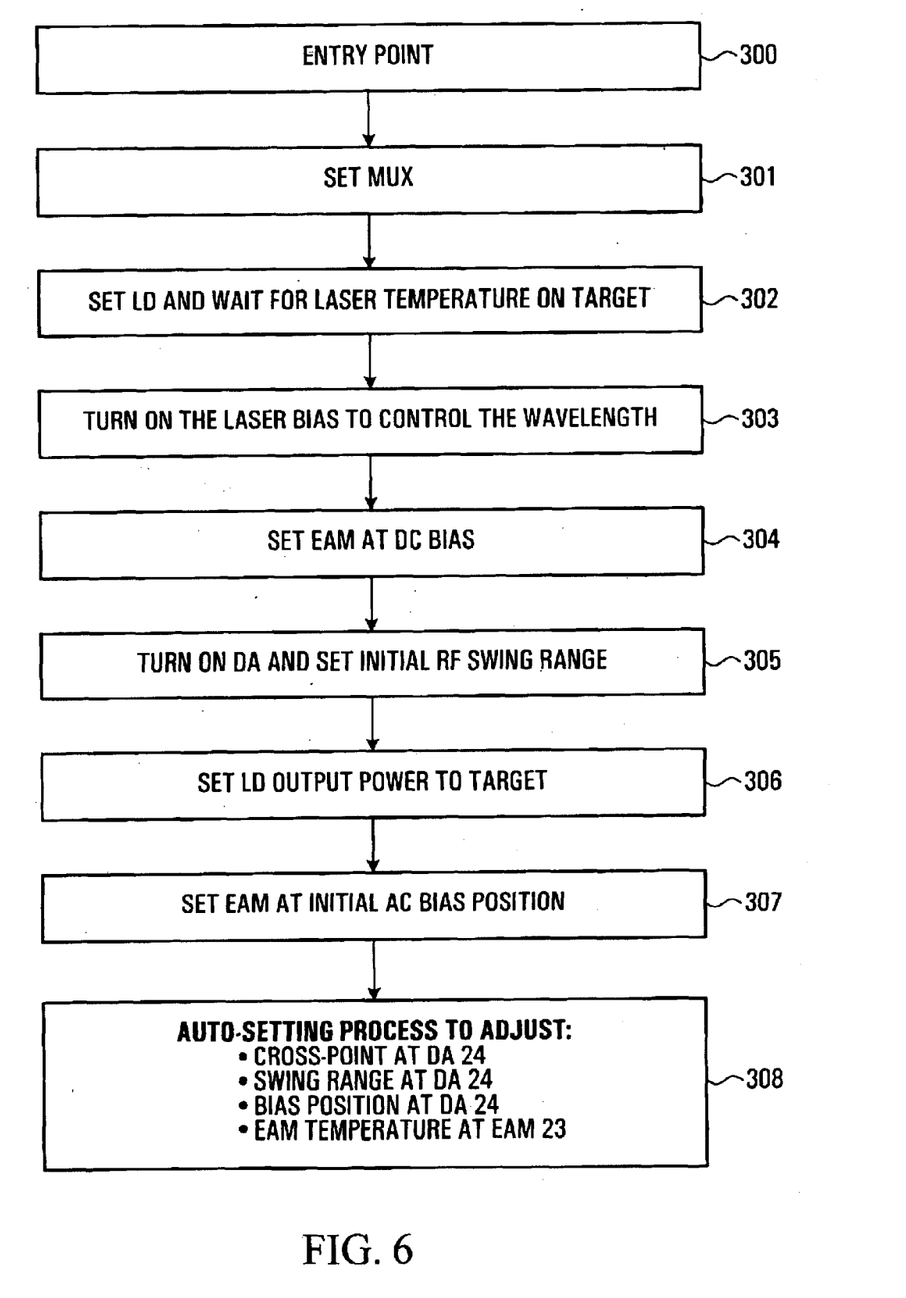
FIG. 6 is a flow chart illustrating a transmitter initialization and setting according to the invention.

FIG. 6 is a flow chart illustrating the transmitter initialization and setting, using the method provided by the invention. Steps 300 to 307 are the conventional initialization steps that the transmitter front-end 20 must go though when it is turned on or reset. These steps do not allow the setting parameters of the transmitter 20 to be optimized based on an end-to-end performance measurement. The present invention provides a means for determining the optimal setting parameters of the transmitter front-end 20 based on an end-to-end performance measurement and that means can be viewed as the additional step 308 in FIG. 6, in which the auto-setting process 202 is carried out on a system wide basis.

Figure 7:
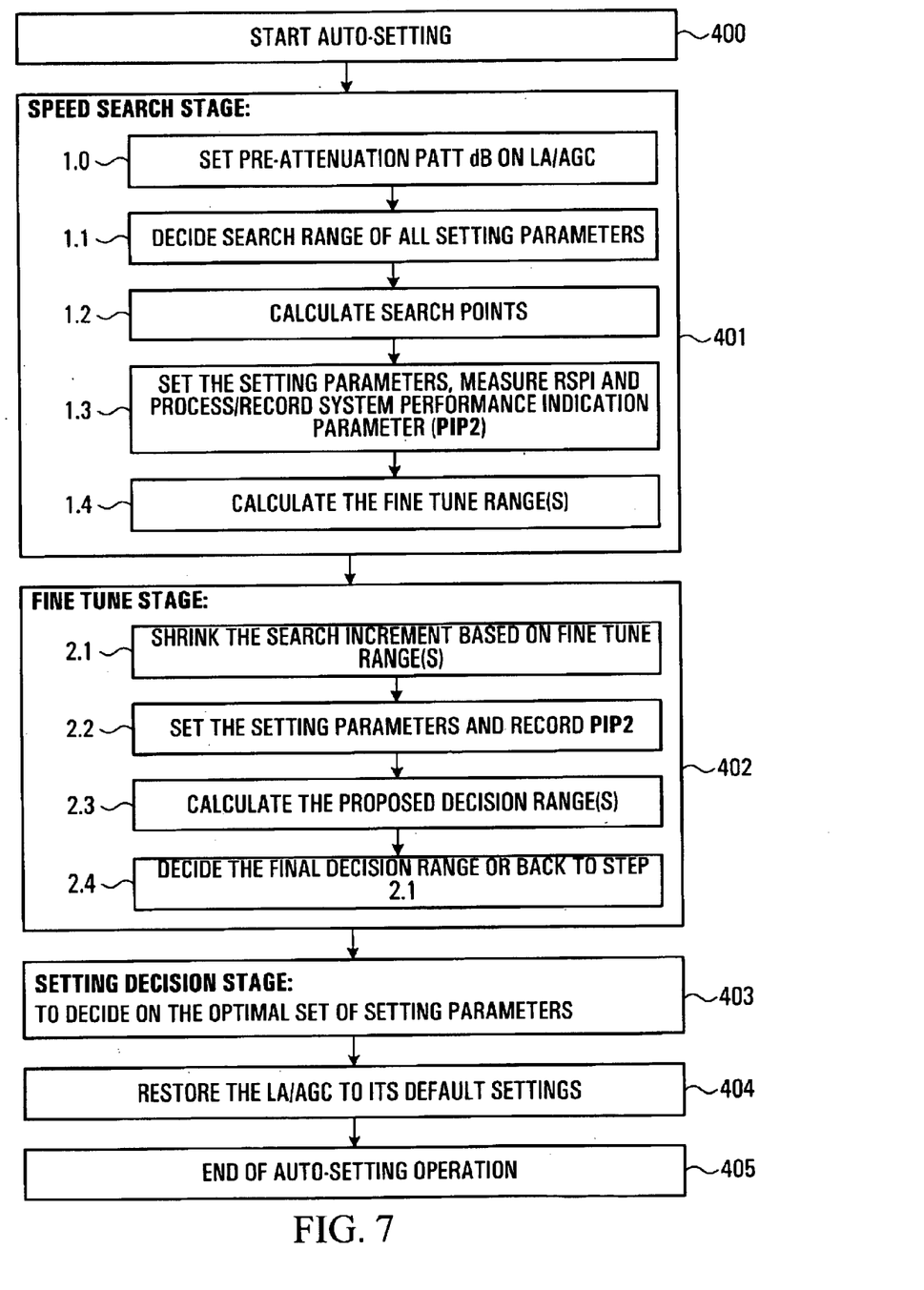
FIG. 7 is a flow chart illustrating an auto-setting process according to the invention.

FIG. 7 is a flow chart illustrating the auto-setting process 202, using the method provided by the invention. Step 400 is the initialization of the auto-setting process 202. Referring to FIG. 5, step 400 corresponds to step 200, where a controller 60 either makes the decision to or is requested to enter the auto-setting mode 202. Step 400 also encapsulates the power-on and end of the initialization process of the transmitter and/or other components of the system as illustrated in FIG. 6, steps 300 to 307. The first true step of the auto-setting process is where the controller 60 carries out a speed search stage 401 to locate possible ranges, in the setting parameter sub-space, where the optimal setting of the setting parameters may reside. The following step is a fine tune stage 402, where the possible ranges of the optimal setting parameters, determined in the previous step, are rigorously searched to find the optical setting parameters. Once the optimal setting are found within the possible ranges, the controller 60 decides upon one set of optimal setting parameters and sends them to the transmitter 20 during setting decision stage 403. In the following step, 404, the linear-amplifier and automatic-gain control circuits are restored to their default settings. Step 405 simply indicates the completion of the auto-setting process 202 and the controller 60 shifting operating modes.

As outlined in FIG. 7 the auto-setting process 202 is a multi-stage procedure. The result of this process is a set of optimal setting parameters including the optimal cross point (Pcp); the optimal bias position (Pbp); the optimal RF swing range (Psr); and, optimal EAM temperature (Pet).

Clearly the auto-setting process 202 can be used in two general instances. The first being the initial auto-setting process used for the power-up of an optical link or one of its components and after a system reset or the reset of a component of the optical link system. The second is a continued auto-setting process needed for all other cases not covered by the initial auto-setting process.

Referring again to FIG. 7, specifically to the speed search stage 401, it can be seen that this stage is comprised of a number of steps. The first step in the speed search is to set the pre-attenuation (Patt), measured in dB, in the LA/AGC 43. The second step is to establish the default values and ranges of the optimal setting parameters from information in the controller memory. The default setting values and the parameter ranges will depend upon the specific line of the system. The default setting values and parameter ranges shall be stored in the controller system default memory from manufacture. The controller system shall also have another memory called the optimal setting memory to store the optimal setting parameter vector and the parameter ranges for speed searching. Both instances of memory can exist within a single bank of random-access memory (RAM).

The third step of the speed search stage 401 is to split the search ranges into smaller ranges according to the resolutions stored in the default setting memory. This is done so that the smaller ranges can be examined quickly to determine whether or not the optimal setting values may exist within them. The smaller ranges that do not meet a predetermined threshold are ignored in the subsequent stages of the auto-setting process 202.

The fourth step is to set the setting parameters in either a random or sequential manner. Each time after setting, the controller 60 shall wait for a time Tss for the system to settle and allow for RSPI measurement. A sample of the long term PIP (i.e. PIP2) shall be processed and recorded. The time window Tss is chosen long enough to ensure a valid PIP2 measurement. Typical values of Tss will ranges from 3 to 4 seconds. Sequence searching is preferred because it does not make timing a critical factor. With sequence searching, a four-dimensional PIP matrix is obtained. This matrix is called the PIP2-matrix. Each dimension corresponds to each of the aforementioned four control points. Note that in order to increase the speed auto-setting process 202, as described in the first step of the Speed Search Stage 401, the pre-attenuation (Patt) must be applied to the LA/AGC 43 within the receiver 40. The Patt will bring the system performance to a level where the aforementioned four-dimensional matrix can be evaluated in a short period of time. If the transmission system's performance is primarily limited by distortions, the measured values for the PIP2-matrix can be used to directly calculate the fine tune range(s). Otherwise, a transformation of the PIP2-matrix is a better choice for cleaner fine tune range(s), although there will not be an impact on the decision correctness.

The last step of the speed search stage 401 is to determine the fine tune range(s) by comparing the PIP values of the PIP2-matrix with predetermined PIP threshold values, PIPss. This is done by identifying all points at which the PIP2 value is greater than or equal to PIPss, followed by grouping the identified points as sub-space(s) or equivalently fine tune range(s) for the proceeding stage. Note that, as an example considering three dimensions, a sub-space is defined as a closed and continuous surface that contains some or all of the selected points. The smallest domain along the surface is a single point. A single speed search could provide one or more sub-spaces (fine tune ranges) to be searched in the fine tune stage 402.

Typically, a single maximum exists for any given EAM and static system. However, due to the fact that the speed search has a course resolution, multiple potential optimal sub-spaces may be identified for a given threshold, PIPss. Thus, the purpose of the fine tune stage 402 is to, using a much finer resolution, determine a single performance-maximum point for the values of the setting parameters, within the sub-spaces identified by the speed search stage 401. Using a fine resolution to start the auto-setting process 202 would be too computationally complex to be done within a reasonable amount of time and a waste of system resources.

During the fine tune stage 402 the fine tune range(s) are further decomposed into smaller decision setting domain(s). The first step of the fine tune stage 402 is to increase the resolution used by, the Speed Search Stage 401, by decreasing the incremental range associated with each setting parameter to a value half of what it is was for the speed search. Effectively this adds a new point between every two points that existed, in the previous step, immediately adjacent to points on each setting direction.

The second step of fine tune stage 402 is to set the setting parameters, measure the end-to-end system performance, process and record the PIP2-matrix, in a way similar that of the third step of the speed search stage 401. In the proceeding step only one setting decision range is identified and recorded, for each sub-space identified in the speed search stage 401 by comparing the PIP values of the PIP2-matrix(s). The single setting decision range is the sub-space that has at most two points per setting parameter direction for all four setting parameters. When more than one sub-space is identified in the speed search stage, the optimal point is decided upon by comparing the best of the worst PIP2-matrix elements over all final ranges of related points of each range. If the PIP is proportional to the BER, the worst PIP2-matrix value is the one with the highest PIP2 value, and the best of the worst PIP2-matrix element is the one with the lowest PIP2 value (i.e. this implies the BER will be very low). Note that the worst is the worst point of a single sub-space; and the best is the best point from all of the selected worst points from each one of the sub-spaces.

The fourth, and final, step of the fine tune stage 402 is to determine whether or not an optimal set of setting parameters has been found. This is done by comparing the worst PIP2-matrix element within the setting decision range to the best PIP2-matrix element(s) of the fine tune range(s), identified in the speed search stage 401, given that this is the first decision range. Otherwise a comparison of the worst PIP2-matrix element within the setting decision range and the best PIP2-matrix element within the setting decision range obtained from the third step of the present stage (401). Upon the appropriate comparison the decision to accept a set of setting parameters as the optimal set is made if the difference of the comparison is less than or equal to a predetermined PIP fine-tune threshold value, PIPft. If the difference is not less than PIPft, the Fine Tune Stage 402 is repeated with an increased resolution used for the search.

The setting decision stage 403 finalizes the set of optimum setting parameters. Using only the final setting decision range obtained during the fine tune stage 402, the set of setting parameters is chosen that result in the best PIP2 value. To complete the auto-setting process 202 the LA/AGC 43 is returned to its default settings and the controller 60 returns to its idle mode 204 of operation, or possible the dynamic control mode 205 if requested/programmed to do so.

Figure 8:
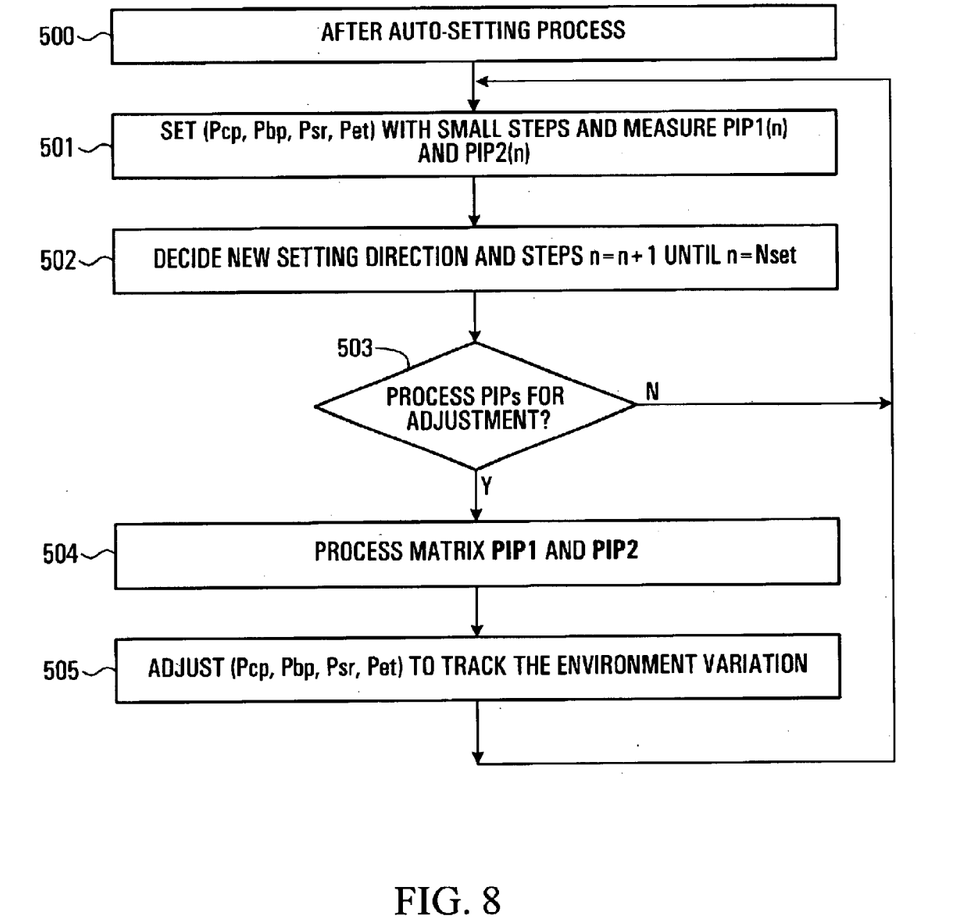
FIG. 8 is a flow chart illustrating a dynamic control process according to the invention.

The controller 60 can be instructed to dynamically maintain the optimal set of setting parameter by entering a dynamic control mode 205. Referring to FIG. 8, it is seen that the Auto-Setting Process 500 has had to occur at least once, after a power-up sequence or reset, before the controller can enter into the dynamic control mode 205. The first step of this process, 501, is to change the setting parameters by a small increment, for each or one at a time, and measure PIP1 and PIP2. The change shall be small enough as not to seriously impact the performance of the system, but rather as a means to collect information about the way the performance of the link is changing. At 502 a new setting direction and the size of increments are decided upon. After a sufficient number data points is collected for the PIP1 and PIP2 matrices, the two matrices are processed for the change, as in 504 to obtain a new set of optimum setting parameters. Then, at 505 the setting parameters are sent to the transmitter to better the system performance. The process then starts again at 501, until the controller 60 is instructed to leave the dynamic control mode 205. Furthermore, the rate at which the EAM setting parameters are set and the PIP values are measured will be far more frequent than rate of the stage adjustment rate.

The description thus far for all of the controller's modes of operation apply to the dynamic control mode 205, with the addition of a special tracking and prediction algorithm required to make decisions on the direction and magnitude of the setting parameters adjustment to track environmental variation. Well known techniques, such as the Least Mean Square (LMS) adaptive estimation algorithm, can be employed for this function.

The aforementioned discussed the present invention applied to a single-span link. However, the invention may also be applied to a multiple-span link comprising the optical transmitter, the optical receiver, and at least two fibres and at least one optical amplifier, the at least two fibres interconnecting in sequence the optical transmitter, the at least one optical amplifier and the optical receiver. The invention may also be applied to single or multiple-span links which contain a multiplexer at one end of the link, a demultiplexer at the other end, multiple transmitters and multiple receivers.

What has been described is merely illustrative of the application of the principles of the invention. Other arrangements and methods can be implemented by those skilled in the art without departing from the spirit and scope of the present invention.

What is claimed is:

1. An optical communication system comprising an optical transmitter, the optical transmitter having a Driver Amplifier (DA) configured to provide a modulated Radio Frequency output signal to an optical modulator, an optical receiver, an optical fibre interconnecting the optical transmitter and the optical receiver, and a controller electrically coupled to the receiver and electrically coupled to the transmitter to supply a control signal thereto, the controller having means for receiving raw system performance information (RSPI) and means for processing the RSPI from which at least one performance indication parameter (PIP) is derived and controlling at least one setting parameter of the DA according to the processing of the RSPI, the controller further configured to enter an idle mode, an auto-setting mode and a dynamic control mode;

wherein the at least one setting parameter is used to control characteristics of the modulated RF signal output of the DA, and wherein in the auto-setting mode, the controller is configured to implement a speed search stage, a fine tune stage and a setting decision stage.

2. An optical communication system according to claim 1, wherein in the speed search stage, the controller is configured for deciding upon a search range of the at least one setting parameter, calculating a plurality of search points, setting at least one setting parameter, determining the performance of the system and calculating the fine tune range.

3. An optical communication system according to claim 1, wherein in the fine tune stage the controller is configured for increasing the search resolution based on the fine tune range, followed setting the at least one setting parameter, determining the performance of the system, generating a decision range from the performance and calculating final decision range.

4. An optical communication system according to claim 1, wherein in the dynamic control mode, the controller is configured for performing the following steps:

i. incrementally changing the at least one setting parameter of the optical transmitter according to a prediction algorithm;

ii. measuring a revised RSPI based on the incrementally changed setting parameter;

iii. calculating at least one revised PIP based on the revised RSPI;

iv. building at least one PIP matrix from multiple cycles of steps i., ii., and iii;

v. adjusting the at least one setting parameter based on the at least one PIP matrix;

vi. repeating steps (4, (ii), (iii), (iv) and (v) until an indication is received by the controller for the dynamic control mode to stop.

5. An optical communication system comprising an optical transmitter, the optical transmitter having a Driver Amplifier (DA), an optical receiver an optical fibre interconnecting the optical transmitter and the optical receiver, and a controller electrically coupled receiver and electrically coupled to the transmitter to supply a control signal thereto, the controller having means for receiving raw system performance information (RSPI) and means for processing the RSPI from which at least one performance indication parameter (PIP) is derived and controlling at least one setting parameter of the DA according to the processing of the RSPI;

wherein the at least one setting parameter is used to control characteristics of an output of the DA;

wherein the controller is configured to enter an idle mode, an auto-setting mode and a dynamic control mode; and wherein in the the auto-setting mode, the controller is configured for implementing a speed search stage, a fine tune stage, and a setting decision stage.

6. An optical communications system according to claim 5, wherein in the speed search stage, the controller is configured for deciding upon a search range of the at least one setting parameter, calculating a plurality of search points, setting at least one setting parameter, determining the performance of the system and calculating the fine tune range.

7. An optical communications system according to claim 5, wherein in the fine tune stage the controller is configured for increasing the search resolution based on the fine tune range, followed setting the at least one setting parameter, determining the performance of the system, generating a decision range from the performance and calculating final decision range.

8. An optical communications system according to claim 5, wherein in the dynamic control mode the controller is configured for implementing the following steps:

i. incrementally changing the at least one setting parameter of the optical transmitter according to a prediction algorithm;

ii. measuring a revised RSPI based on the incrementally changed setting parameter;

iii. calculating at least one revised PIP based on the revised RSPI;

iv. building at least one PIP matrix from multiple cycles of steps i., ii., and iii;

v. adjusting the at least one setting parameter based on the at least one PIP matrix;

vi. repeating steps (i), (ii), (iii), (iv) and (v) until an indication is received by the controller for the dynamic control mode to stop.

* * * * *